(12) United States Patent
Yang

(10) Patent No.: US 7,984,288 B2
(45) Date of Patent: Jul. 19, 2011

(54) SOFTWARE PROTECTION APPARATUS AND PROTECTION METHOD THEREOF

(75) Inventor: Chungjen Yang, Taipei (TW)

(73) Assignee: Sercomm Corporation, Taipei (TW)

( * ) Notice: Subject to any disclaimer, the term of this patent is extended or adjusted under 35 U.S.C. 154(b) by 887 days.

(21) Appl. No.: 11/802,112

(22) Filed: May 21, 2007

(65) Prior Publication Data

US 2008/0295084 A1    Nov. 27, 2008

(51) Int. Cl.
*H04L 29/06* (2006.01)
*G06F 11/30* (2006.01)
*G06F 15/16* (2006.01)
*G09C 5/00* (2006.01)
*G06F 21/22* (2006.01)
*G06F 9/445* (2006.01)

(52) U.S. Cl. .............. 713/152; 713/189; 709/201

(58) Field of Classification Search ............ 713/152, 713/189; 709/201
See application file for complete search history.

(56) References Cited

U.S. PATENT DOCUMENTS

| 6,006,328 | A | 12/1999 | Drake | |
|---|---|---|---|---|
| 2002/0144153 | A1 | 10/2002 | LeVine et al. | |
| 2003/0221116 | A1* | 11/2003 | Futoransky et al. | 713/189 |
| 2005/0183072 | A1 | 8/2005 | Horning et al. | |
| 2008/0162620 | A1* | 7/2008 | Schulz et al. | 709/201 |

FOREIGN PATENT DOCUMENTS

| GB | 2196169 A * | 4/1988 |
|---|---|---|
| WO | WO 9901815 | 1/1999 |

OTHER PUBLICATIONS

Sirish A. Kondi, Yoginder S. Dandass, "Scanning workstation memory for malicious codes using dedicated coprocessors", Mar. 2006, ACM-SE 44: Proceedings of the 44th annual Southeast regional conference, Publisher: ACM, pp. 661-666.*
European Search Report dated Feb. 1, 2008.
English language translation of abstract of WO 9901815 (published Jan. 14, 1999).

* cited by examiner

*Primary Examiner* — Matthew B Smithers
*Assistant Examiner* — Courtney D Fields
(74) *Attorney, Agent, or Firm* — Thomas|Kayden

(57) ABSTRACT

A software protection apparatus and its protection method are disclosed. The software protection apparatus includes a storage unit and a processing unit. The storage unit has a program area and a data area. The program area is used to save an executable. The processing unit generates a reference pointer based on internal information of the executable, and the reference pointer then is saved to the program area or the data area. The processing unit then generates an algorithm based on at least one characteristic of the executable to save the algorithm to a specific position of the program area or the data area through the reference pointer, and employs the algorithm to perform an encoding action for the executable to generate a wrap program that is saved to the program area. When the wrap program is decoded, the reference pointer is obtained through a restore program to take the algorithm out. The wrap program then is restored to become the executable by using the algorithm.

40 Claims, 6 Drawing Sheets

SOFTWARE PROTECTION APPARATUS AND PROTECTION METHOD THEREOF

FIELD OF THE INVENTION

The present invention generally relates to a software protection apparatus and its protection method, and more specifically relates to save a reference pointer and an algorithm to software and use a restore program to protect a software source code.

BACKGROUND OF THE INVENTION

Just-In-Time (JIT) program language, such as Java or .net, usually hides a source code in a binary executable. Although the aforesaid way is a good idea, this way also attracts many professional hackers that distribute many tools to obtain the executable to be restored to become the source code. The source code may be modified without any permission from programmers. Moreover, important classified information hid in the source code may be stolen resulting in enormous damages for the programmers and related units. It is an important issue of making a safer executable to prevent illegal tools from infringing software's intellectual property and prevent the hackers and intended people from intruding, thereby protecting the programmers, related units and users.

A software protection apparatus and its protection method have been disclosed in the prior art. The method for protecting software uses an external temporary file to save a reference pointer, and records an algorithm of encoding the executable through the reference pointer to prevent the executable and a source code from being modified or stolen.

The aforesaid drawbacks are that the external temporary file is easily stolen by the hackers. The hackers only need to crack the external temporary file, and then obtain the reference pointer. The algorithm then is taken out based on the reference pointer and the executable is restored based on the algorithm to easily obtain the source code. Consequently, the source code or classified information is modified and acquired.

To overcome the foregoing shortcomings, the inventor(s) of the present invention based on years of experience in the related field to conduct extensive researches and experiments, and finally invented a software protection apparatus and its protection method, as a method or a basis for resolving the foregoing drawbacks.

SUMMARY OF THE INVENTION

Briefly, it is a primary object of the present invention to provide a software protection apparatus and its protection method, and more particularly to save a reference pointer and an algorithm in software and to protect a software source code by using a restore program, thereby satisfying a user and overcoming drawbacks in the prior art. Moreover, the reference pointer and the algorithm may not be easily taken out and the restore program can be further deleted to prevent the restore program from being obtained by an outside. Further, the executable can be restricted to be used in a specific machine.

To achieve the foregoing object, the software protection apparatus disclosed by the invention includes a storage unit and a processing unit, wherein the storage unit has a program area and a data area. The program area is used to save an executable, and the processing unit is used to generate a reference pointer based on internal information of the executable, and the reference pointer then is saved to the program area or the data area. The processing unit further generates an algorithm based on at least one characteristic of the executable to save the algorithm to a specific position of the program area or the data area by using the reference pointer, and employs the algorithm to perform an encoding action for the executable to generate a wrap program that is saved to the program area.

A second object of the present invention is to provide a method for protecting software, and the method includes the following steps of:

(a) Dividing a storage unit into a program area and a data area, and saving an executable to the program area;

(b) Utilizing a processing unit to generate a reference pointer based on internal information of the executable, and saving the reference pointer to the program area or the data area;

(c) Generating an algorithm based on at least one characteristic of the executable;

(d) Saving the algorithm to a specific position of the program area or the data area through the reference pointer; and (e) Employing the algorithm to perform an encoding action for the executable to generate a wrap program that is saved to the program area.

A third object of the present invention is to provide a software protection apparatus that includes a storage unit and a processing unit, wherein the storage unit has a program area and a data area, and the program area saves a wrap program. The processing unit obtains a reference pointer at the program area or the data area through a restore program to take an algorithm at a specific position of the program area or the data area out based on the reference pointer. The processing unit further restores the wrap program to become an executable through the algorithm.

A fourth object of the present invention is to provide a method for protecting software, and the method includes the following steps of:

(a) Dividing a storage unit into a program area and a data area, and saving a wrap program to the program area;

(b) Utilizing a processing unit to obtain a reference pointer at the program area or the data area through a restore program;

(c) Taking an algorithm at a specific position of the program area or the data area out based on the reference pointer; and (d) Restoring the wrap program to become an executable through the algorithm.

A fifth object of the present invention is to provide a software protection apparatus that includes a storage unit and a processing unit, wherein the storage unit has a program area and a data area, and the program area saves an executable. The processing unit generates a reference pointer based on internal information of the executable, and the reference pointer then is saved to the program area or the data area. The processing unit then generates an algorithm based on at least one characteristic of the executable to save the algorithm to a specific position of the program area or the data area through the reference pointer, and uses the algorithm to perform an encoding action for the executable to generate a wrap program that is saved to the program area. When the wrap program is decoded, the reference pointer is obtained through a restore program to take the algorithm out based on the reference pointer. The wrap program then is restored to become the executable through the algorithm.

A sixth object of the present invention is to provide a method for protecting software, and the method includes the following steps:

(a) Dividing a storage unit into a program area and a data area, and saving an executable to the program area;

(b) Utilizing a processing unit to generate a reference pointer based on internal information of the executable, and saving the reference pointer to the program area or the data area;

(c) Generating an algorithm based on at least one characteristic of the executable;

(d) Saving the algorithm to a specific position of the program area or the data area through the reference pointer;

(e) Utilizing the algorithm to perform an encoding action for the executable to generate a wrap program that is saved to the program area;

(f) Obtaining the reference pointer through a restore program when the wrap program is decoded;

(g) Taking the algorithm out based on the reference pointer; and (h) Restoring the wrap program to become the executable through the algorithm.

To make it easier for our examiner to understand the object of the invention, its innovative features and performance, a detailed description and technical characteristics of the present invention are described together with the drawings as follows.

DETAILED DESCRIPTION OF THE PREFERRED EMBODIMENTS

Figure 1:
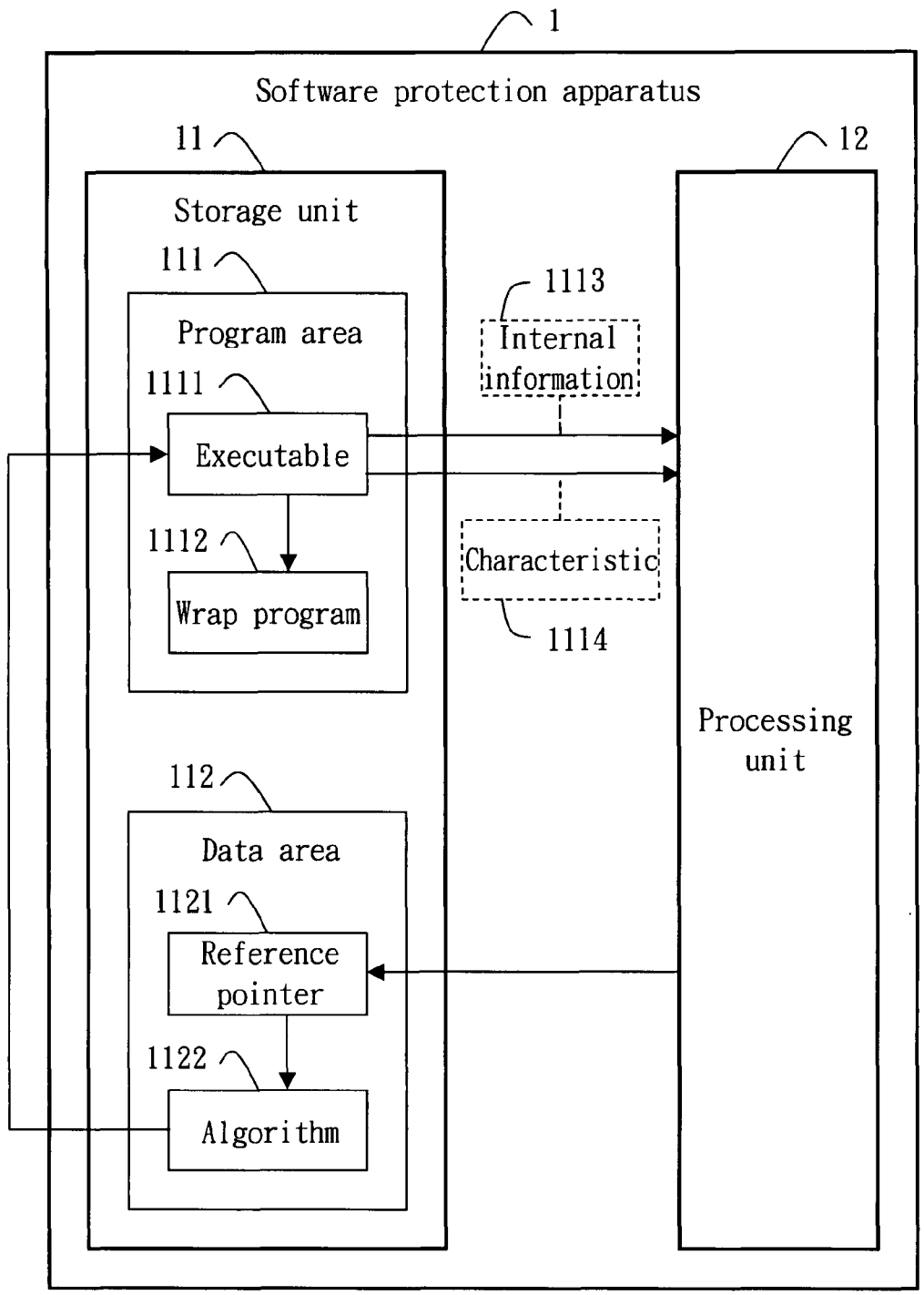
FIG. 1 is a block diagram illustrating a software protection apparatus according to a first embodiment of the invention.

Referring to the related figures for the software protection apparatus and its protection method according to a preferred embodiment of the present invention, wherein the same elements are described by the same reference numerals.

Referring to FIG. 1 for the block diagram of a software protection apparatus according to a first embodiment of the invention is illustrated. The software protection apparatus 1 includes a storage unit 11 and a processing unit 12. The storage unit 11 is preferably a hard drive, a flash memory or any type of memories, and has a program area 111 and a data area 112. The program area 111 is used to save an executable 1111. The processing unit 12 is preferably a processor, and generates a reference pointer 1121 based on internal information 1113 of the executable 1111. The reference pointer 1121 then is saved to the program area 111 or the data area 112. The processing unit 12 then generates an algorithm 1122 based on at least one characteristic 1114 (e.g. the size or file structure) of the executable 1111 to save the algorithm 1122 to a specific position of the program area 111 or the data area 112 through the reference pointer 1121, and employs the algorithm 1122 to perform an encoding action for the executable 1111 to generate a wrap program 1112 that is saved to the program area 111. It should be noted that the reference pointer 1121 is further selected from the internal information 1113 of the executable 1111 by using a random number, and the algorithm 1122 is preferably a reversible algorithm.

Figure 2:
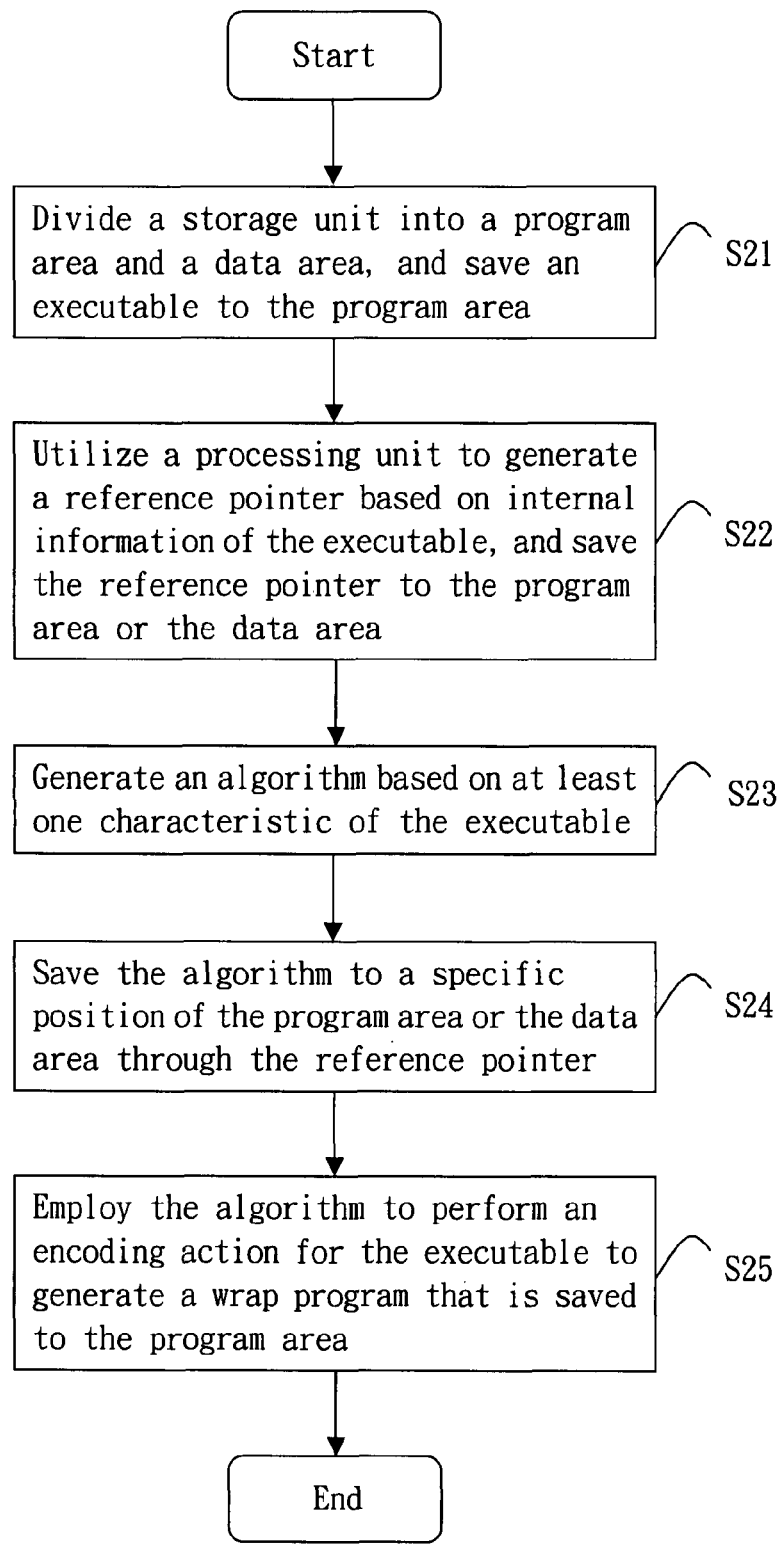
FIG. 2 is a flowchart illustrating a method for protecting software according to a first embodiment of the invention.

Referring to FIG. 2 for the flow chart illustrates a method for protecting software according to a first embodiment of the invention. The method for protecting software corresponds to the block diagram of the software protection apparatus as shown in FIG. 1, and includes the following steps:

Step S21: Divide a storage unit 11 into a program area 111 and a data area 112, and save an executable 1111 to the program area 111. The storage unit 11 is preferably a hard drive, a flash memory or any type of memories.

Step S22: Utilize a processing unit 12 (e.g. a processor) to generate a reference pointer 1121 based on internal information 1113 of the executable 1111, and save the reference pointer 1121 to the program area 111 or the data area 112. The reference pointer 1121 is further selected from the internal information 1113 of the executable 1111 by using a random number.

Step S23: Generate an algorithm 1122 based on at least one characteristic 1114 (e.g. the size or file structure) of the executable 1111. The algorithm 1122 is preferable a reversible algorithm.

Step S24: Save the algorithm 1122 to a specific position of the program area 111 or the data area 112 through the reference pointer 1121.

Step S25: Employ the algorithm 1122 to perform an encoding action for the executable 1111 to generate a wrap program 1112 that is saved to the program area 111.

Figure 3:
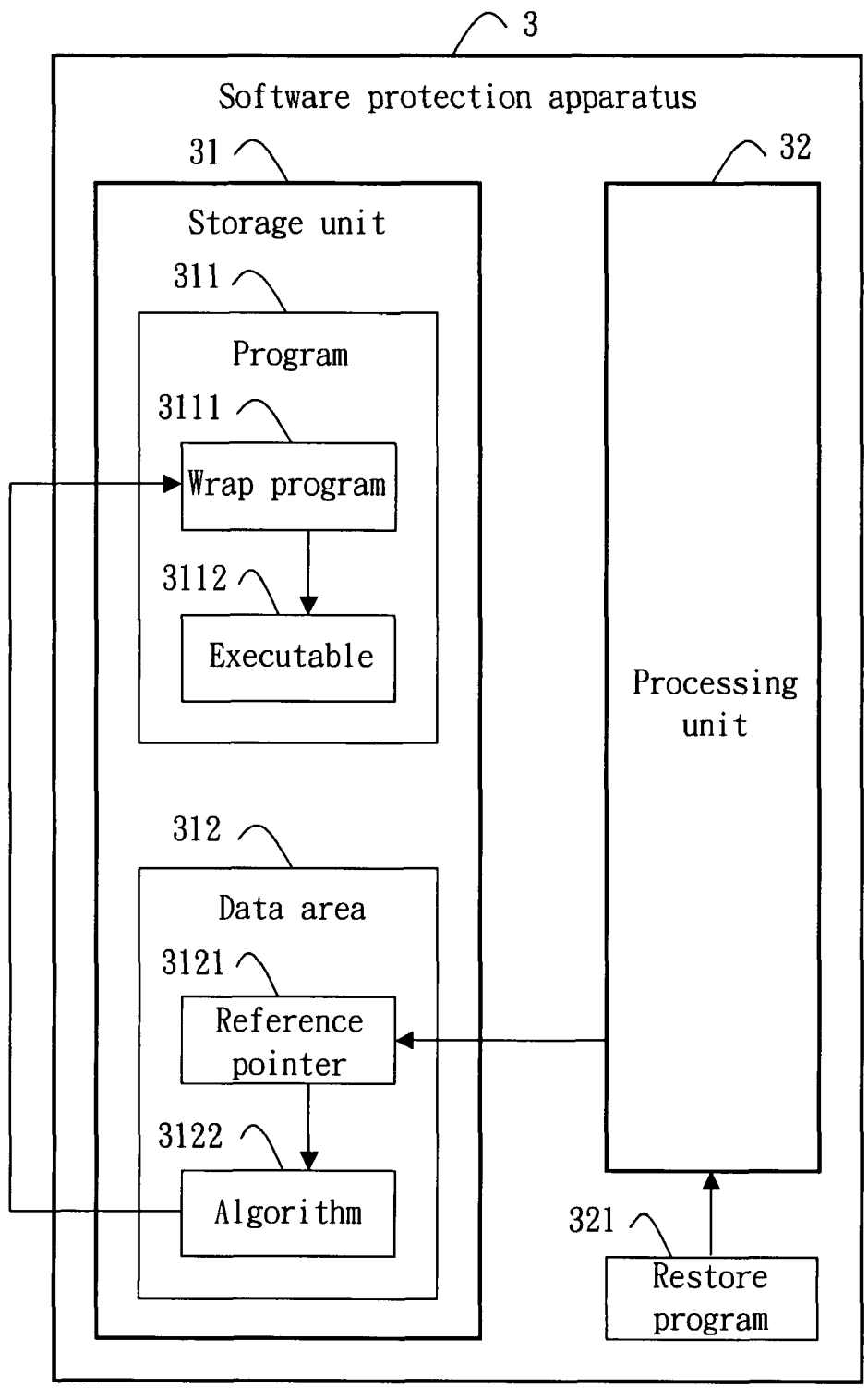
FIG. 3 is a block diagram illustrating a software protection apparatus according to a second embodiment of the invention.

Referring to FIG. 3 for the block diagram illustrates a software protection apparatus according to a second embodiment of the invention. The software protection apparatus 3 includes a storage unit 31 and a processing unit 32. The storage unit 31 is preferably a hard drive, a flash memory or any type of memories, and has a program area 311 and a data area 312, and the program area 311 is used to save a wrap program 3111. The processing unit 32 is preferably a processor, and obtains a reference pointer 3121 at the program area 311 or the data area 312 through a restore program 321 to take an algorithm 3122 at a specific position of the program area 311 or the data area 312 out based on the reference pointer 3121. The processing unit 32 further restores the wrap program 3111 at the program area 311 to become an executable 3112 through the algorithm 3122. It should be noted that the restore program 321 can be saved to the program area 311, the data area 312 or a memory, and is deleted after restoring the executable 3112 to prevent the restore program 321 from being obtained by an outside. Further, the restore program 321 further includes machine identification (machine ID) to limit the executable 3112 to be used in a specific machine. The algorithm 3122 is preferably a reversible algorithm.

Figure 4:
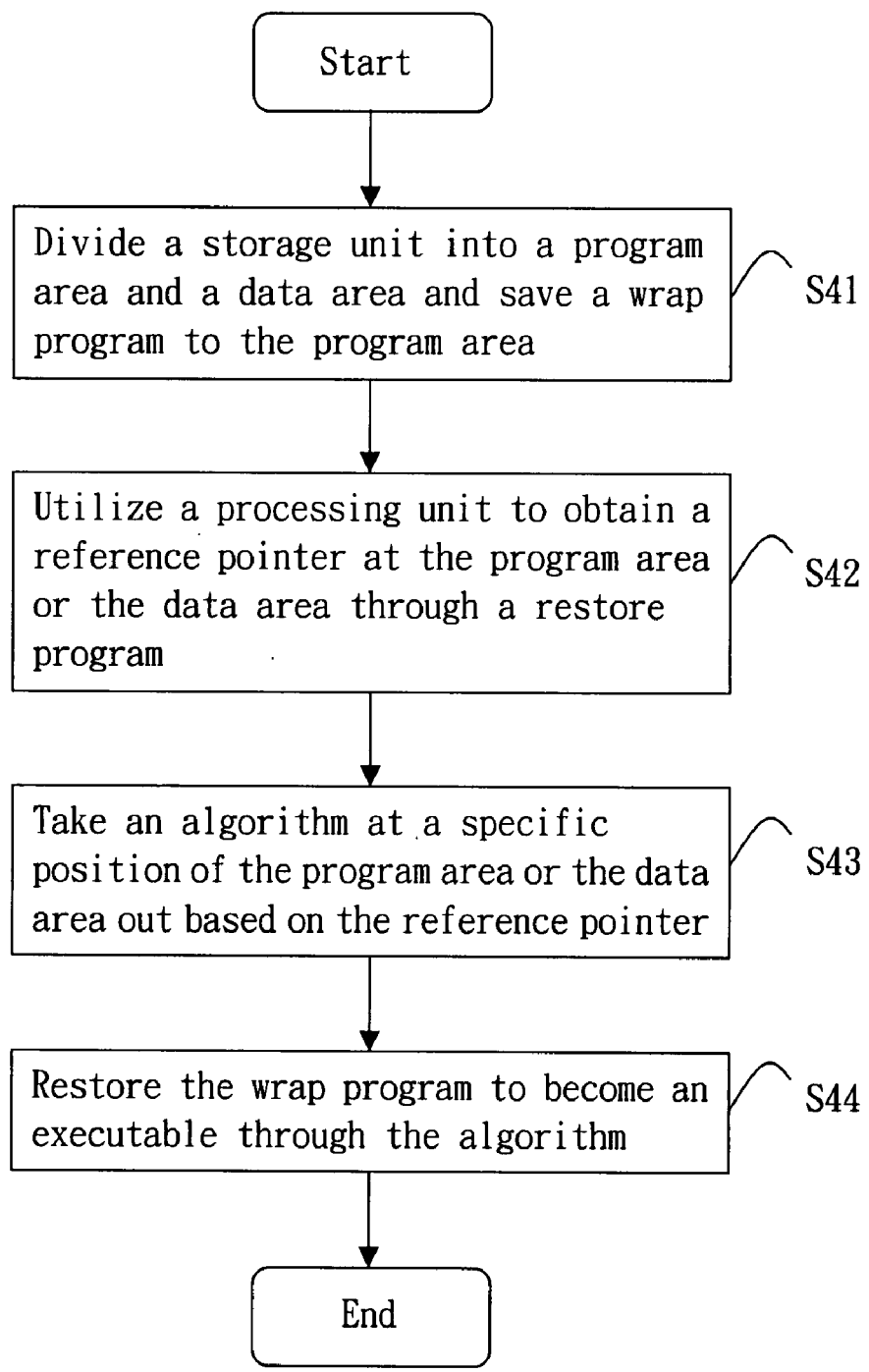
FIG. 4 is a flowchart illustrating a method for protecting software according to a second embodiment of the invention.

Referring to FIG. 4 for the flow chart illustrates a method for protecting software according to a second embodiment of the invention. The method for protecting software corresponds to the block diagram of the software protection apparatus shown in FIG. 3, and includes the following steps:

Step S41: Divide a storage unit 31 into a program area 311 and a data area 312 and save a wrap program 3111 to the program area 311. The storage unit 31 is preferably a hard drive, a flash memory or any type of memories.

Step S42: Utilize a processing unit 32 (e.g. a processor) to obtain a reference pointer 3121 at the program area 311 or the data area 312 through a restore program 321. The restore program 321 can be saved to the program area 311, the data area 312 or a memory, and can be deleted after restoring an executable 3112 to prevent the restore program 321 from being obtained by an outside. The restore program 321 further includes machine ID to limit the executable 3112 to be used in a specific machine.

Step S43: Take an algorithm 3122 at a specific position of the program area 311 or the data area 312 out based on the reference pointer 3121. The algorithm 3122 can be a reversible algorithm.

Step S44: Restore the wrap program 3111 to become the executable 3112 through the algorithm 3122.

Figure 5:
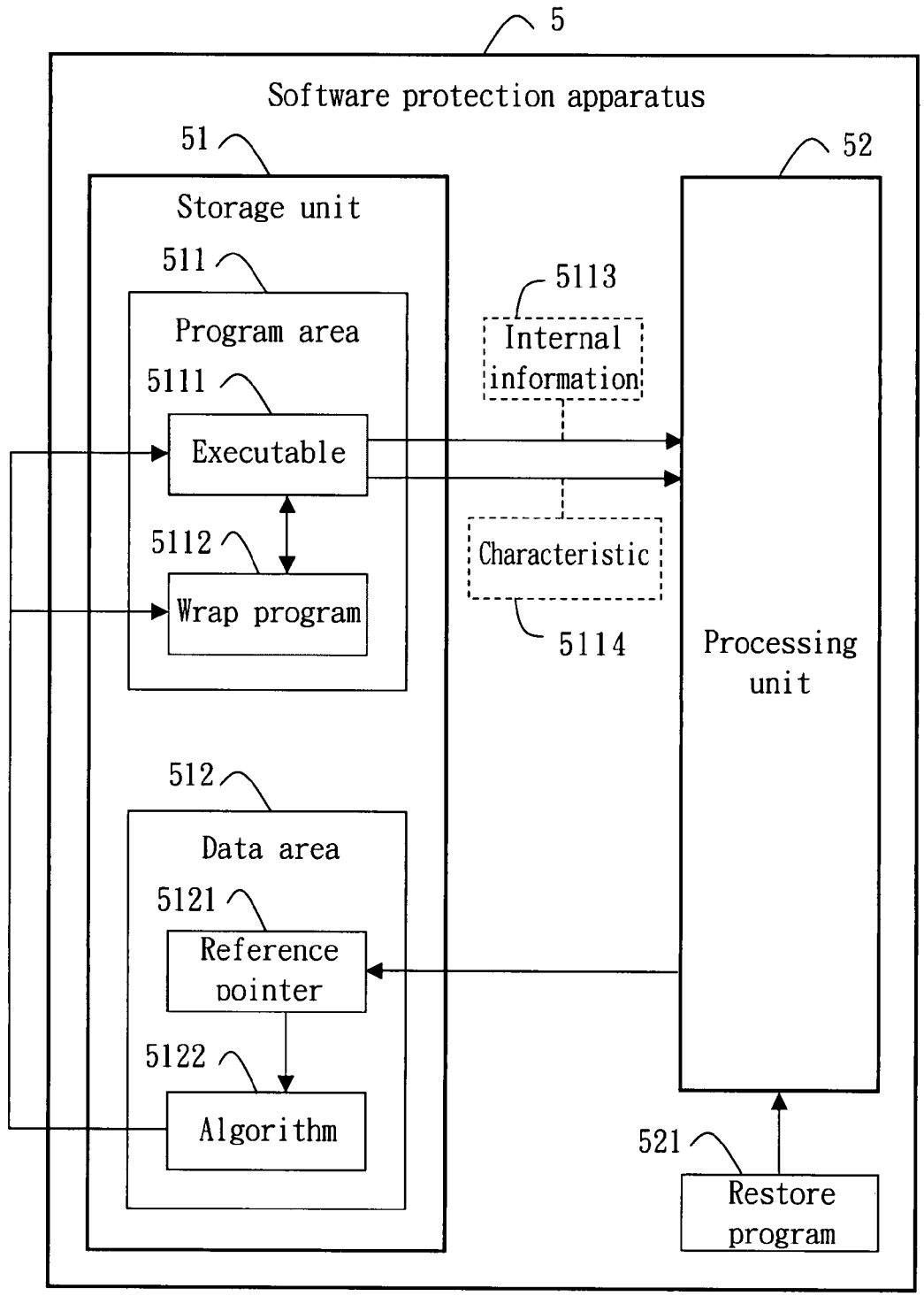
FIG. 5 is a block diagram illustrating a software protection apparatus according to a third embodiment of the invention.

Referring to FIG. 5 for the block diagram illustrates a software protection apparatus according to a third embodiment of the invention. The software protection apparatus 5 includes a storage unit 51 and a processing unit 52. The storage unit 51 is preferably a hard drive, a flash memory or any type of memories, and has a program area 511 and a data area 512. The program area 511 is used to save an executable 5111. The processing unit 52 is preferably a processor, and generates a reference pointer 5121 based on internal information 5113 of the executable 5111. The reference pointer 5121 then is saved to the program area 511 or the data area 512. The processing unit 52 then generates an algorithm 5122 based on at least one characteristic 5114 (e.g. the size or file structure) of the executable 5111 to save the algorithm 5122 to a specific position of the program area 511 or the data area 512 through the reference pointer 5121, and employs the algorithm 5122 to perform an encoding action for the executable 5111 to generate a wrap program 5112 that is saved to the program area 511. When the wrap program 5112 is decoded, the reference pointer 5121 is obtained through a restore program 521 to take the algorithm 5122 out based on the reference pointer 5121. The wrap program 5112 then is restored to become the executable 5111 through the algorithm 5122. It should be noted that the reference pointer 5121 is further selected from the internal information 5113 of the executable 5111 by using a random number. The algorithm 5122 can be a reversible algorithm. Moreover, the restore program 521 can be saved to the program area 511, the data area 512 or a memory, and can be deleted after restoring the executable 5111 to prevent the restore program 521 from being obtained by an outside. The restore program 521 further includes machine ID to limit the executable 5111 to be used in a specific machine.

Figure 6:
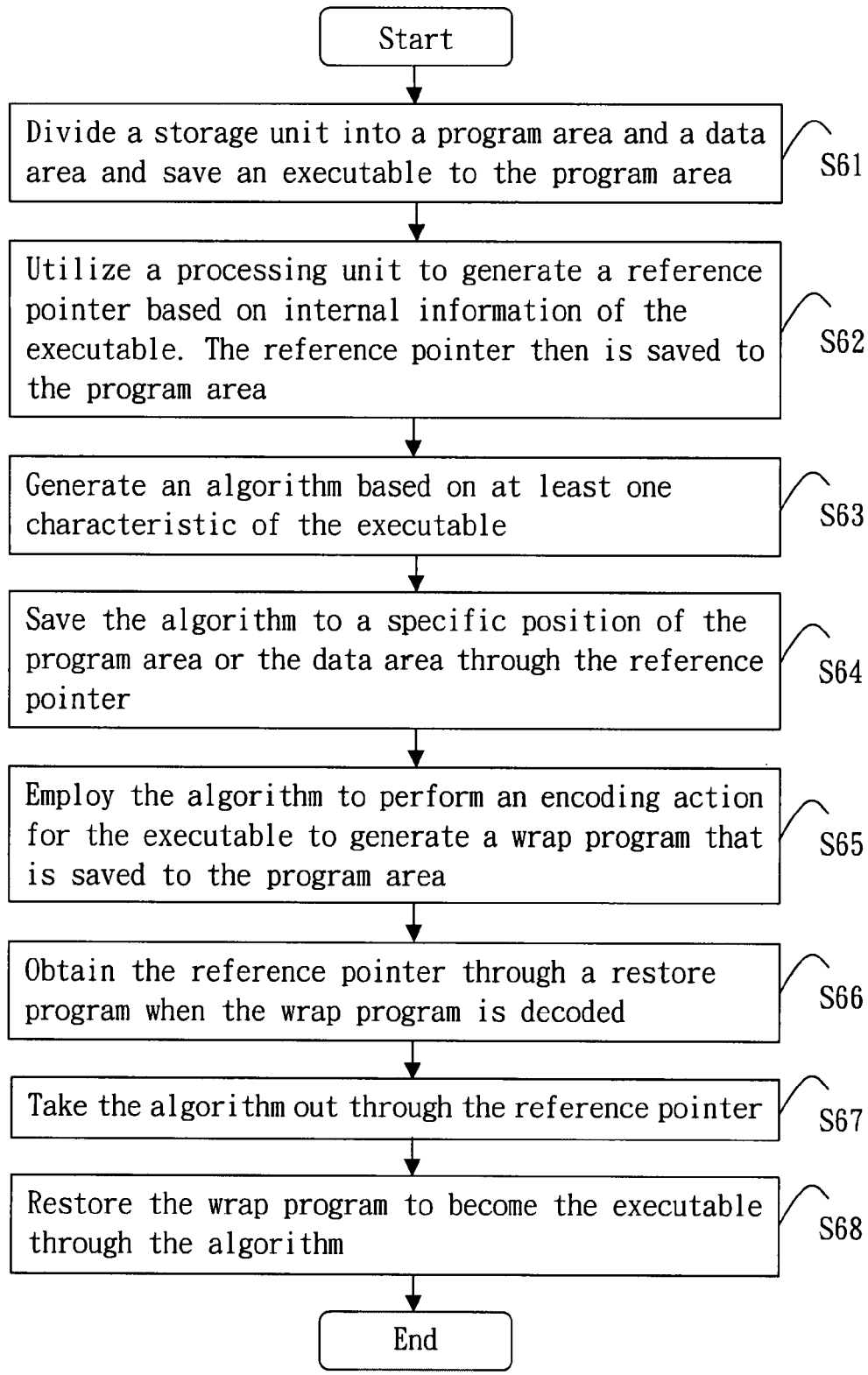
FIG. 6 is a flowchart illustrating a method for protecting software according to a third embodiment of the invention.

Referring to FIG. 6 for the flow chart illustrates a method for protecting software according to a third embodiment of the invention. The method for protecting software corresponds to the block diagram of the software protection apparatus shown in FIG. 5, and includes the following steps:

Step S61: Divide a storage unit 51 into a program area 511 and a data area 512, and save an executable 5111 to the program area 511. The storage unit 51 is preferably a hard drive, a flash memory or any type of memories.

Step S62: Utilize a processing unit 52 (e.g. a processor) to generate a reference pointer 5121 based on internal information 5113 of the executable 5111. The reference pointer 5121 then is saved to the program area 511 or the data area 512. The reference pointer 5121 is further selected from the internal information 5113 of the executable 5111 by using a random number.

Step S63: Generate an algorithm 5122 based on at least one characteristic 5114 (e.g. the size or file structure) of the executable 5111. The algorithm 5122 can be a reversible algorithm.

Step S64: Save the algorithm 5122 to a specific position of the program area 511 or the data area 512 through the reference pointer 5121.

Step S65: Employ the algorithm 5122 to perform an encoding action for the executable 5111 to generate a wrap program 5112 that is saved to the program area 511.

Step S66: Obtain the reference pointer 5121 through a restore program 521 when the wrap program 5112 is decoded. The restore program 521 is saved to the program area 511, the data area 512 or a memory, and is deleted after restoring the executable 5111 to prevent the restore program 521 from being obtained by an outside. Moreover, the restore program 521 further includes machine ID to limit the executable 5111 to be used in a specific machine.

Step S67: Take the algorithm 5122 out through the reference pointer 5121.

Step S68: Restore the wrap program 5112 to become the executable 5111 through the algorithm 5122.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A software protection apparatus, comprising:
    a storage unit having a program area and a data area, and the program area for saving an executable; and
    a processing unit for selecting a reference pointer from an internal information of the executable, and the reference pointer being saved to the program area or the data area, and generating an algorithm based on at least one characteristic of the executable to save the algorithm to a specific position of the program area or the data area through the reference pointer, and performing an encoding action for the executable through the algorithm to generate a wrap program that is saved to the program area.

2. The software protection apparatus of claim 1, wherein the storage unit includes a hard drive, a flash memory or any type of memories.

3. The software protection apparatus of claim 1, wherein the processing unit is a processor.

4. The software protection apparatus of claim 1, wherein the reference pointer is selected from the internal information of the executable by using a random number.

5. The software protection apparatus of claim 1, wherein the characteristic includes a size or a file structure of the executable.

6. The software protection apparatus of claim 1, wherein the algorithm is a reversible algorithm.

7. A method for protecting software, comprising:
    dividing a storage unit into a program area and a data area, and saving an executable to the program area;
    using a processing unit to select a reference pointer an internal information of the executable, and the reference pointer being saving to the program area or the data area;
    generating an algorithm based on at least one characteristic of the executable;
    utilizing the reference pointer to save the algorithm to a specific position of the program area or the data area; and
    employing the algorithm to perform an encoding action for the executable to generate a wrap program that is saved to the program area.

8. The method for protecting software of claim 7, wherein the storage unit includes a hard drive, a flash memory or any type of memories.

9. The method for protecting software of claim 7, wherein the processing unit is a processor.

10. The method for protecting software of claim 7, wherein the reference pointer is selected from the internal information of the executable by using a random number.

11. The method for protecting software of claim 7, wherein the characteristic includes a size or a file structure of the executable.

12. The method for protecting software of claim 7, wherein the algorithm is a reversible algorithm.

13. A software protection apparatus, comprising:
a storage unit having a program area and a data area, and the program area for saving a wrap program; and
a processing unit for obtaining a reference pointer at the program area or the data area through a restore program, and obtaining an algorithm at a specific position of the program area or the data area based on the reference pointer, and further restoring a wrap program to become an executable through the algorithm, wherein the restore program is deleted after restoring the executable to prevent the restore program from being obtained by an outside.

14. The software protection apparatus of claim 13, wherein the storage unit includes a hard drive, a flash memory or any type of memories.

15. The software protection apparatus of claim 13, wherein the processing unit is a processor.

16. The software protection apparatus of claim 13, wherein the restore program is saved to the program area, the data area or a memory.

17. The software protection apparatus of claim 13, wherein the restore program further includes machine identification (ID) to limit the executable to be used in a specific machine.

18. The software protection apparatus of claim 13, wherein the algorithm is a reversible algorithm.

19. A method for protection software, comprising:
dividing a storage unit into a program area and a data area, and saving a wrap program to the program area;
using a processing unit to obtain a reference pointer at the program area and a data area through a restore program;
taking an algorithm at a specific position of the program area or the data area out based on the reference pointer;
employing the algorithm to restore the wrap program to become an executable; and
deleting the restore program after restoring the executable to prevent the restore program from being obtained by an outside.

20. The method for protection software of claim 19, wherein the storage unit includes a hard drive, a flash memory or any type of memories.

21. The method for protection software of claim 19, wherein the processing unit is a processor.

22. The method for protection software of claim 19, wherein the restore program is saved to the program area, the data area or a memory.

23. The method for protection software of claim 19, wherein the restore program further includes machine identification (ID) to limit the executable to be used in a specific machine.

24. The method for protection software of claim 19, wherein the algorithm is a reversible algorithm.

25. A software protection apparatus, comprising:
a storage unit having a program area and a data area, and the program area for saving an executable; and
a processing unit for generating a reference pointer based on internal information of the executable, and the reference pointer being saved to the program area or the data area, and generating an algorithm based on at least one characteristic of the executable to save the algorithm to a specific position of the program area or the data area through the reference pointer, and utilizing the algorithm to perform an encoding action for the executable to generate a wrap program that is saved to the program area, and when the wrap program is decoded, the reference pointer is obtained through a restore program to take the algorithm out based on the reference pointer, and further restoring the wrap program to become the executable through the algorithm, wherein the restore program is deleted after restoring the executable to prevent the restore program from being obtained by an outside.

26. The software protection apparatus of claim 25, wherein the storage unit includes a hard drive, a flash memory or any type of memories.

27. The software protection apparatus of claim 25, wherein the processing unit is a processor.

28. The software protection apparatus of claim 25, wherein the reference pointer is selected from the internal information of the executable by using a random number.

29. The software protection apparatus of claim 25, wherein the characteristic includes a size or a file structure of the executable.

30. The software protection apparatus of claim 25, wherein the algorithm is a reversible algorithm.

31. The software protection apparatus of claim 25, wherein the restore program is saved to the program area, the data area or a memory.

32. The software protection apparatus of claim 25, wherein the restore program further includes machine identification (ID) to limit the executable to be used in a specific machine.

33. A method for protecting software, comprising:
dividing a storage unit into a program area and a data area, and saving an executable to the program area;
using a processing unit to generate a reference pointer based on internal information of the executable, and the reference pointer being saved to the program area or the data area;
generating an algorithm based on at least one characteristic of the executable;
saving the algorithm to a specific area of the program area or the data area through the reference pointer;
using the algorithm to perform an encoding action for the executable to generate a wrap program that is saved to the program area;
obtaining the reference pointer through a restore program when the wrap program is decoded;
taking the algorithm out based on the reference pointer;
restoring the wrap program to become the executable through the algorithm;
deleting the restore program after restoring the executable to prevent the restore program from being obtained by an outside.

34. The method for protecting software of claim 33, wherein the storage unit includes a hard drive, a flash memory or any type of memories.

35. The method for protecting software of claim 33, wherein the processing unit is a processor.

36. The method for protecting software of claim 33, wherein the reference pointer is selected from the internal information of the executable by using a random number.

37. The method for protecting software of claim 33, wherein the characteristic includes a size or a file structure of the executable.

38. The method for protecting software of claim 33, wherein the algorithm is a reversible algorithm.

39. The method for protecting software of claim 33, wherein the restore program is saved to the program area, the data area or a memory.

40. The method for protecting software of claim 33, wherein the restore program further includes machine identification (ID) to limit the executable to be used in a specific machine.

* * * * *